Patented Jan. 25, 1944

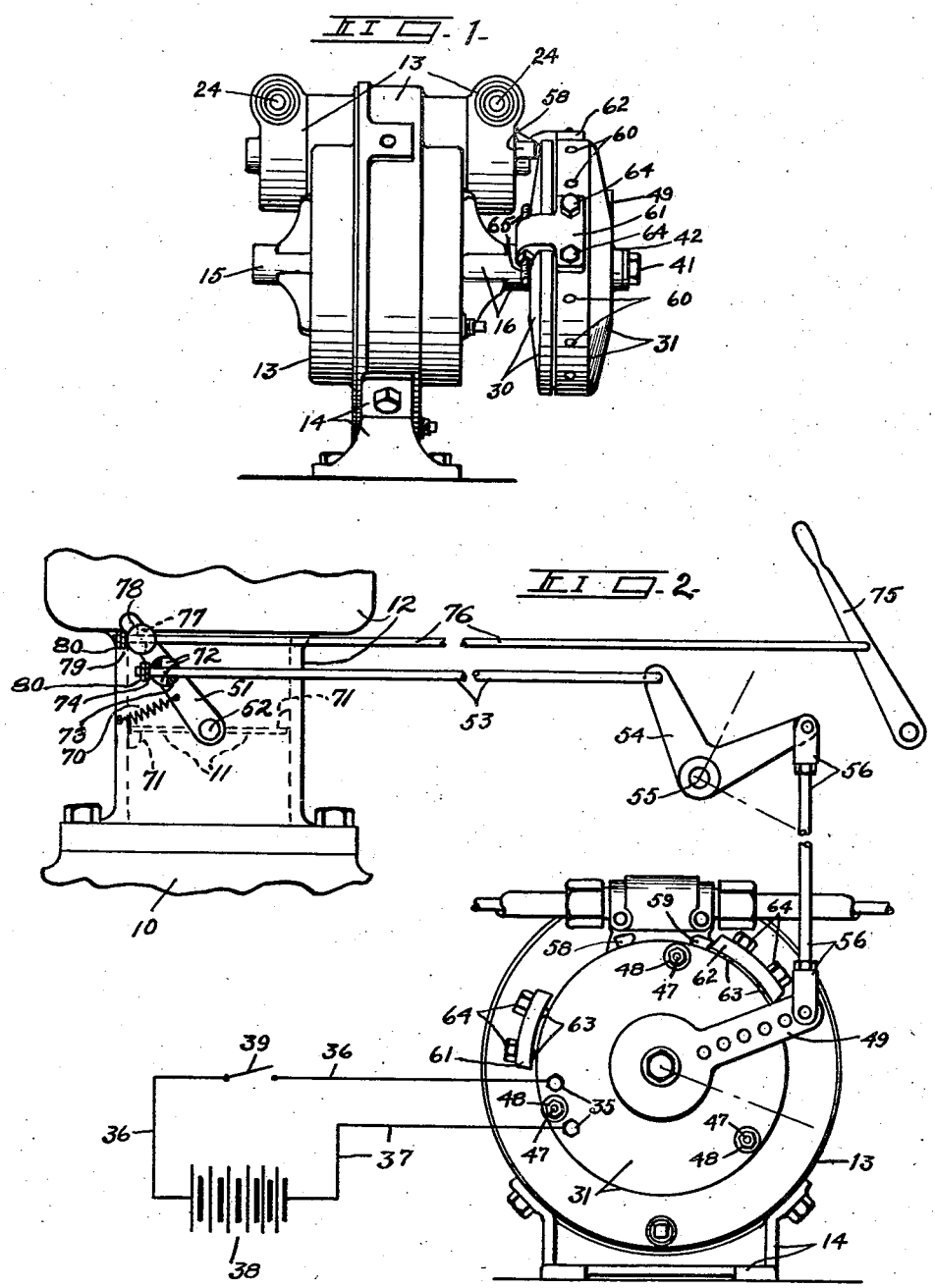

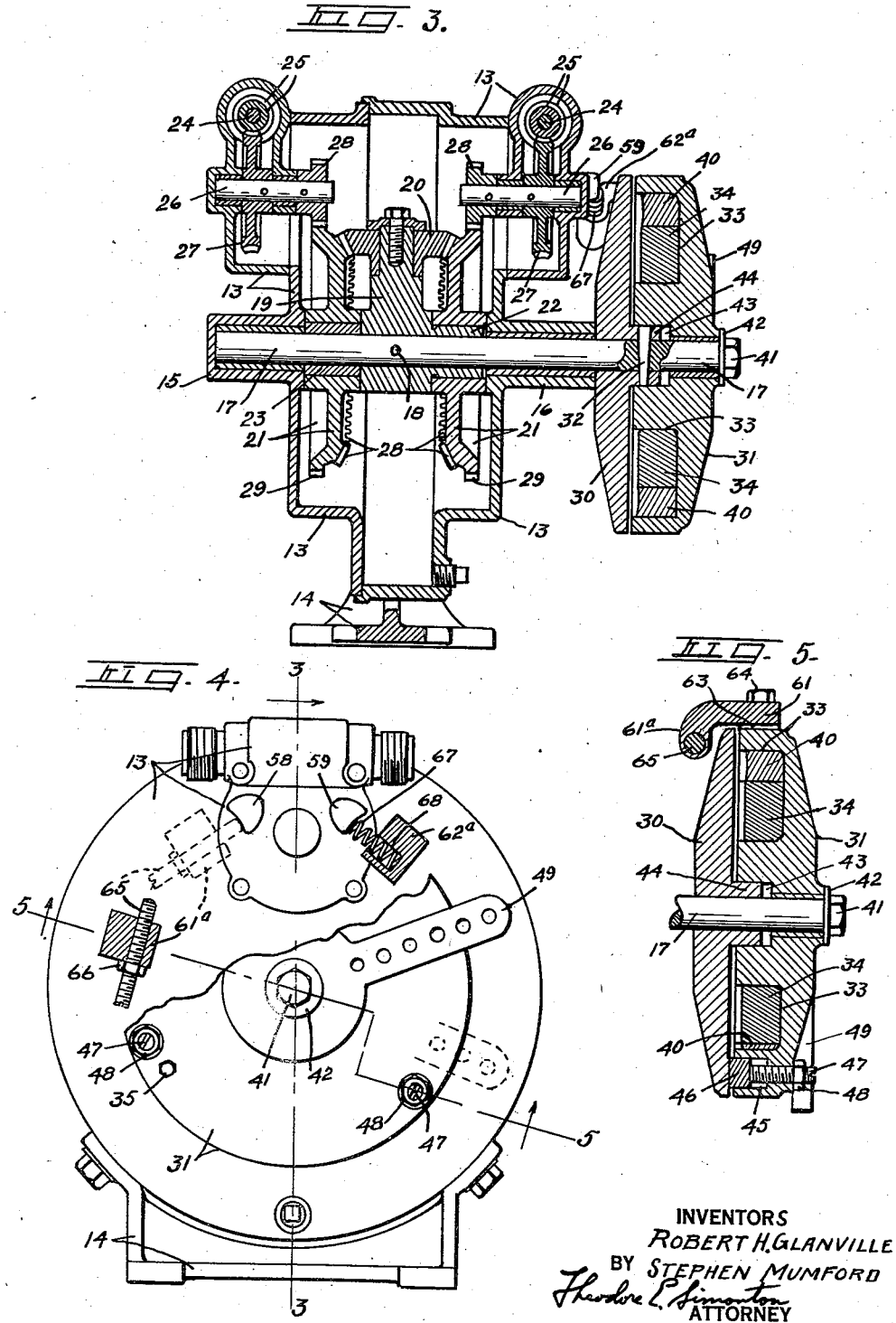

2,339,989

UNITED STATES PATENT OFFICE 2,339,989

AUTOMATIC SPEED SYNCHRONIZING MECHANISM FOR TWIN MOTORS

Robert H. Glanville and Stephen Mumford, Seneca Falls, N. Y., assignors to Caleb Smith, Seneca Falls, N. Y.

Application December 26, 1942, Serial No. 470,138

7 Claims. (Cl. 60—97)

The invention relates to improvements in automatic speed synchronizing mechanisms for twin motors or engines such, for example, as two marine or aircraft motors of the internal combustion type.

The principal object of the invention is to provide an improved mechanism of simple construction for automatically so controlling the speed of one motor as to maintain it at substantially the speed of another motor, the operation of which is manually controlled.

Other objects of the invention are to provide an automatic speed synchronizer which is operable with a minimum of friction and shock, which may be readily rendered effective or ineffective at will, and which includes provisions whereby the speed of both motors may be directly manually controlled or either engine may be operated alone, if desired, without injury to the synchronizer unit or the motors.

A further object of the invention is to provide an improved synchronizer of the type disclosed in United States patents to Moore, No. 2,054,908, granted September 22, 1936, and Smith, No. 2,217,971, granted October 15, 1940.

A further object of the invention is to provide in an automatic speed synchronizer an improved governing clutch mechanism.

To the foregoing and other ends which will appear from the following description of the preferred embodiment of the invention illustrated in the accompanying drawings, the invention consists in the features of construction, arrangements of parts and combinations of elements and devices particularly pointed out in the appended claims.

In the accompanying drawings,

Figure 1 is a side elevation of the synchronizer unit.

Figure 2 is an end view of the unit as viewed from the right in Figure 1, showing parts of the connections between the unit and the two gasolene engines or motors with which it is associated.

Figure 3 is a vertical sectional view on the line 3—3 of Figure 4.

Figure 4 is a detail view similar to Figure 2 showing the unit on an enlarged scale with certain parts broken away and parts of the connections to the motors omitted.

Figure 5 is a detail sectional view approximately on the line 5—5 of Figure 4 and showing more particularly the clutch mechanism of the synchronizer.

The improved synchronizing means is connectible with two engines or motors each having the usual manually operable means for starting and stopping the motor and for controlling its speed of operation. When connected with the two motors, the synchronizing means may be rendered effective or ineffective, and when it is in effective condition, it will automatically regulate the speed of one of the motors in accordance with the speed of the other motor operating under manual control. The construction is such that while the synchronizer is in its effective condition, the following or automatically controlled motor will automatically be caused to operate at substantially the same speed as the leading or manually controlled motor irrespective of the cause of changes of speed of the leading motor. When used in connection with twin gasolene motors or engines, such as twin motors of marine or aircraft power plants, the synchronizer may be connected to operate the manually operable throttle valve or the manually operable carburetor throttle valve of the following motor.

In the drawings an installation is shown for synchronizing twin gasolene motors of ordinary construction, only so much of the installation being shown as is necessary for a clear understanding of the present invention.

In the construction shown in the drawings, the following motor or automatically controllable motor 10 of two twin gasolene motors of conventional construction has the usual manually operable throttle valve or butterfly valve 11 of its carburetor 12 connected as hereinafter described with the improved automatic speed synchronizer unit. It will be understood that both the motor 10 and its companion motor, not shown, are equipped with suitable manual control means for starting, stopping and regulating the speed thereof, including a valve 11 for each motor.

The synchronizing unit includes a housing 13 anchored to a base 14 fixedly secured to a suitable foundation adjacent the two motors.

The end walls of housing or casing 13 are provided with bearings 15 and 16 for a horizontal rotative shaft 17. One end of this shaft abuts the closed outer end of bearing 15 and the other end of the shaft protrudes from the casing. Fixed to shaft 17 midway the end walls of housing 13 by means of a suitable pin or key 18 is a radially extending arm or driver 19 having a reduced end portion of round cross-section upon which is rotatively journaled and held the planetary or connecting gear or pinion 20 of a differential gearing which comprises said pinion and two side gears 21 in mesh therewith. The hub of each side gear abuts the adjacent end wall of the housing and the adjacent side face of driver arm 19, one of said side gears being rotative on a sleeve-like cylindrical extension 22 of said arm encircling shaft 17, and the other side gear being rotative on a cylindrical bearing sleeve 23 encircling the shaft 17.

Journaled in the upper portion of the housing adjacent opposite ends of the housing are two parallel short shafts 24, each of which extends horizontally at a right angle to shaft 17 above said shaft 17. Each of said shafts 24 has fixed thereon a worm gear 25. Journaled in the housing below the shafts 24 are two short shafts 26 extending parallel to and above shaft 17. Each shaft 26 has fixed thereon a worm wheel 27 meshing with the adjacent one of the worm gears 25, and also has fixed thereon a pinion 28 meshing with the adjacent side gear of the differential gearing. The two trains 25—26—27—28 provide a speed reduction gearing connection between each shaft 24 and the connected side gear 21 of the differential gearing. Each side gear has an annular set of teeth 28 meshing with the teeth of the pinion 20 and an annular set of teeth 29 meshing with the teeth of the adjacent pinion 28.

The outer end of one of the shafts 24 (the right hand shaft as viewed in Figures 1 and 3) is connected by suitable means, such as a flexible shaft, with the leading engine for rotative driving of said shaft 24 in one direction by the leading engine, and the other shaft 24 is similarly connected with the following engine for rotative driving of said shaft by that engine in a direction opposite to the direction of rotation of the first-mentioned one of the shafts 24.

Mounted on the protruding end of shaft 17 exteriorly of housing 13 are the two metallic heads 30 and 31 of an electromagnetic slip clutch, said heads having circular peripheries. Head 30 constitutes the armature head of the electromagnetic slip clutch and is fixed to shaft 17 by a key or pin 32 to rotate with said shaft with one face of said head abutting the outer end of bearing 16 and the other flat face of said head opposed to the inner face of head 31. Head 31 is the electromagnet head of the clutch and has an annular recess 33 formed in its inner face. Countersunk in this recess is the annular induction or field coil 34 of the magnet, the ends of which coil are connected to terminals 35 carried by the head and extending to the outer face thereof. The line wires 36—37 of an electric circuit are connected to these terminals and to the terminals of an electric battery 38 or other source of electric current, the line wire 36 containing a manually operable switch 39 for making and breaking the circuit to energize and de-energize the electromagnet at will. The coil is held or sealed in the recess by a retaining mass 40 of asphalt.

Clutch head 31 is rotative, and also minutely axially slidable, relatively to shaft 17. A nut 41 threaded on the outer end of shaft 17, and a washer 42 interposed between said nut and the outer face of head 31, hold said head on the shaft and limit outward sliding movement of the head away from head 30. Head 31 is further supported and guided by means of an axial cylindrical recess 43 in its inner face which is maintained in telescopic engagement with a cylindrical hub 44 formed on head 30. To permit regulation of the torque exerted by the magnet or head 31 on the armature or head 30, to prevent accidental sticking together of the heads, and to reduce friction therebetween in operation of the synchronizer, the head 31 has a plurality of recesses 45 in its inner face uniformly spaced around its axis and extending parallel to its axis adjacent the perimeter of the head, in each of which recesses (three being employed in the construction shown) is slidably mounted a button or plug 46 preferably formed of "Oilite" or other self-lubricating material or composition. Adjusting screws 47 threaded through the head 31 bear against said buttons 46 and are locked in adjusted position by lock nuts 48 threaded on said screws and bearing against the outer face of head 31. Screws 47 and blocks or buttons 46 limit the approach of head 31 to head 30 to provide an air gap between the heads. By adjusting the width of the air gap, the torque exerted on head 30 by the magnet 31 can be varied. The screws 47 are so adjusted that the projecting ends of the buttons 46 bear lightly against the flat opposed face of head 30 when the magnet head 31 is deenergized and are held pressed firmly against said face of head 30 when head 31 is energized.

At its outer face the head 31 is formed with an integral arm 49 which extends radially of shaft 17 and said head. This arm is connected by suitable linkage with the manually operable speed control throttle valve 11 of the following engine 10, which valve is normally urged toward closed position by a return spring 70. The linkage shown comprises an arm 51 fixed on the pivot shaft 52 of valve 11 and normally urged by spring 70 to rock the valve to closed position against valve stops 71, a horizontal link 53 connecting arm 51 to the normally upstanding arm of a bellcrank 54 which is mounted on a fixed axis 55, and a normally vertical link 56 connected at its upper end to the normally laterally extending arm of the bellcrank 54 and connected at its lower end to the arm 49 to urge said arm 49 to the position shown in full lines in the drawings when valve 11 of the following engine 10 is fully closed by spring 70.

The electromagnet or driven head 31 of the electromagnetic clutch is conversely rotative about shaft 17 through an arc which is sufficient to permit rocking of throttle valve 11 from its fully closed to its fully open position or vice versa. Rotation of this head 31 relatively to shaft 17 is limited by two fixed stops on the casing 13 and by two stop means adjustably mounted on said head.

Formed on the casing 13, and projecting laterally therefrom adjacent the periphery of the clutch heads, are two stationary limit stops 58 and 59. Extending into the head 31 from the periphery thereof is an annular series of threaded holes 60. Two metal blocks 61 and 62, each having a pair of spacing ribs 63 on its inner face contacting the periphery of the head 31, are each held to said head 31 by two clamping bolts 64 threaded into appropriate ones of the holes 60. By selection of the pairs of holes in which the pairs of bolts are threaded, the spacing of the blocks about the periphery of head 31 may be varied to provide rough or approximate adjustments of the arc of oscillation of head 31 and its connected arm 49. Further and more minute final adjustments of this arc may be obtained by adjusting a stop screw 65 which is threaded through a head 61ª formed on block 61 for abutment of the fixed stop 58 by one end of said screw when the valve 11 is fully opened. Stop screw 65 is locked in its adjusted position by a lock nut 66. The block 62 is formed with a head 62ª, and a compression spring or yieldable stop 67 has one end thereof suitably anchored or fixed in a recess 68 in head 62ª and its other end protruding from said head for endwise abutment thereof against fixed stop 59. The stop device 62—62ª—67 is so adjusted on head 31 that spring 67 abuts stop 59 in the fully closed position of valve 11 with spring 67 not under compression. Upon rapid return of valve 11 by its spring, the spring 67 will abut stop 59 and be momentarily compressed to absorb inertia shocks, the link 53 moving relatively to the valve operating arm during momentary compression and following full extension of spring stop element 67 after valve 11 of engine 10 is fully closed and held closed by spring 70.

The link 53 is connected with operating arm 51 of valve 11 of the following engine 10 in the following manner: The left hand end of said link (as viewed in Figure 2) extends slidably through a slot 72 in a stud 73 held to said arm 51, and carries an abutment or head 74 to the left of said stud for engaging the stud to rock the arm 51 in opposition to spring 70 to move valve 11 to fully opened position when head 31 is rotated into its limit position determined by stops 58—65.

The usual manually shiftable pivoted control handle 75 for valve 11 of the following engine 10 is, as shown in Figure 2, preferably connected in a like manner to that just described to said arm 51. As shown, said handle 75 has connected thereto one end of a link 76, the other end of which (the left hand end as viewed in Figure 2) extends slidably through a slot 77 in a stud 78 held to arm 51. Link 76 carries an abutment or head 79 to the left of stud 78 for engaging said stud to rock the arm 51 in opposition to spring 70 to open valve 11 variably up to and including full opening of said valve.

The abutments or heads 74 and 79 are held to their respective links to shift therewith, and preferably each abutment is in the form of a nut threaded on its associated link, and each said nut is held in adjusted position by a suitable lock nut 80. Each of the slots 72 and 77 has its upper and lower edges flared from each other from a point midway the length of the slot to prevent cramping of the links engaged in said slots. Arm 51 may be rocked to open valve 11 of engine 10 by pull of either one of the links 53 and 76 without movement of the other one of said links.

The mode of operation of the mechanism will be obvious to those skilled in the art but will be briefly set out. When the two motors whose speeds are to be synchronized are in operation, the described differential gearing will cause the shaft 17 to rotate in one direction when the speed of the following motor from any cause exceeds that of the leading motor and to rotate in the opposite direction when the speed of the following motor is less than that of the leading motor, and said gearing will, while the speeds of the motors are equal, hold the shaft 17 against rotation. The shaft will, when rotated, turn the armature head to rotatively drive the magnet head either to permit spring 70 to move the speed controlling element 11 of the following motor in speed reducing direction or to cause link 53 to pull arm 51 to move element 11 in speed increasing direction, dependent upon whether the speed of the following motor is greater or less than that of the leading motor. If the magnet head is maintained energized while both motors are in operation, the speeds of the two motors will always be maintained substantially equal. Opening of switch 39 de-energizes the magnet head and renders the synchronizer ineffective.

If the magnet head is de-energized, the return spring of the speed controlling valve of the following motor will move said valve to zero speed position, and if this movement is a rapid one, the cushion stop 67 will momentarily compress slightly to absorb the inertia forces of arrest of the head 31 and arm 49.

When the magnet head is maintained de-energized, either or both motors may be put into operation and the speed thereof directly manually controlled by the manually operable speed controlling means of the respective motor or motors. When so operated, the armature head of the clutch may rotate without turning the de-energized magnet head of the clutch since there is substantially no driving torque transmitted from head to head under these conditions due to de-energization of the magnet and to the very small frictional contact area afforded by buttons 46 between the heads and to the fact that the pressure of the contact buttons 46 against the armature head is reduced when the magnet head is de-energized. Under these conditions, it will be noted that the heads 30 and 31 may be relatively rotated, when required, with very little friction between head 30 and head 31. In the event of over-rotation of head 31 in valve-closing direction, head 62ª will abut stop 59 if spring 67 be compressed wholly into socket 68.

It will be noted that the synchronizing mechanism may be enabled and disabled at will by simply actuating the switch 39, and that said mechanism when disabled is not subject to injury by friction and will not affect proper operation of either or both motors under direct manual control.

We claim:

1. An automatic speed synchronizing mechanism for twin motors each having a manually operable and spring returned element manually shiftable to control its speed of operation, comprising, in combination, a support, a shaft rotatively mounted on the support, a differential gear train connected with said shaft and connective with both motors whose speeds are to be synchronized for positive driving of said shaft in one direction or the opposite direction respectively in accordance with any increase or decrease in the speed of one motor over that of the other, an electromagnetic slip clutch having a driving head fixed on said shaft and an opposed driven head mounted on said shaft for rotative and limited axial sliding movement relatively to the shaft and the driving head, the driven head being an electromagnet and the driving head being a metallic armature for coaction with said magnet, a source of current electrically connected with said magnet for energizing the latter, an electric switch manually operable to maintain the source of current electrically connected with or disconnected from the magnet at will, means connecting the magnetic head of the clutch with the manually operable speed controlling element of one of the motors for automatic movement of said speed controlling element in speed increasing direction when the speed of said motor drops below that of the other motor and in speed reducing direction when the speed of said first-mentioned motor exceeds that of said other motor, while said magnetic head is maintained energized, and stop means for automatically arresting rotation of said magnetic head by said driven armature head when said manually operable speed controlling element is located in either a zero speed or full speed position of said element.

2. An automatic speed synchronizing mechanism as claimed in claim 1, wherein the armature head of the clutch has a face perpendicular to the shaft and opposed to the magnetic head of the clutch, and the magnetic head of the clutch has a plurality of elements mounted thereon about the shaft for slip bearing engagement with said face of the armature head and adjustable axially of the shaft to maintain different selected air gaps between the clutch heads, whereby the driving torque may be varied at will.

3. An automatic speed synchronizing mechanism as claimed in claim 1, wherein the stop means comprises a pair of fixed stops mounted on the support in spaced position about the shaft adjacent the clutch, and a pair of stops mounted on the magnetic head of the clutch for engagement of one thereof with one of said fixed stops when the speed controlling element connected with the magnetic head reaches full speed position and for engagement of the other one thereof with the remaining fixed stop when said element reaches zero speed position, the last-mentioned stop on the magnetic head being yieldable under impact with its companion fixed stop, and means for holding the second-mentioned pair of stops to the magnetic head of the clutch in variably spaced relation to each other about the shaft.

4. In an automatic speed synchronizing mechanism for twin motors each having a speed controlling element, the combination of a rotatively mounted shaft, a differential gearing drivable by the motors whose speeds are to be synchronized and connected with said shaft to rotate the latter in one direction or the other in accordance with an increase or decrease in the speed of one motor over that of the other motor, an electromagnetic slip clutch having a driving head positively rotated by said shaft and a driven head which is rotative and axially slidable relatively to the shaft and is connected with the speed controlling element of one of the motors for actuation of said element upon converse rotary movements of the driven head, stop means for arresting rotation of the driven head by the driving head at two positions of the driven head at which said speed controlling element is positioned respectively in the zero speed and full speed positions of said element, and manually controlled means for at will maintaining said electromagnetic clutch energized for automatic synchronization of motor speeds or de-energized for operation of either or both motors under direct manual control.

5. A speed synchronizing mechanism for twin motors each provided with a speed controlling element comprising, in combination, a rotatively mounted electromagnet, stop means for arresting the magnet at each of two oscillated positions of the magnet about its axis, an armature for said magnet mounted for rotation about an axis coincident with that of the magnet, means operable by two motors whose speeds are to be synchronized to maintain said armature stationary when the motors are operating at equal speed and to rotate said armature in one direction while the speed of one motor is greater and in the opposite direction when the speed of said motor is less than that of the other motor, said magnet having provision for connecting it with the speed controlling element of one of the motors for controlling the actuation of said element upon oscillation of the magnet.

6. A speed synchronizing mechanism as claimed in claim 5, wherein the stop means comprise a pair of stop carriers, means for holding each of said carriers independently of the other to the magnet at either of a plurality of different selected points around the circumference of the magnet, a compression spring cushion stop held to one of said carriers, an adjustable screw stop threaded in the other carrier, and fixed stop means with which said spring and screw stops are coactive.

7. A speed synchronizing mechanism as claimed in claim 5, wherein said magnet is engageable with said armature solely through a plurality of small interposed thrust elements equally spaced about the axes of the magnet and armature and carried by one of the latter for adjustment toward and from the other.

ROBERT H. GLANVILLE.
STEPHEN MUMFORD.